United States Patent [19]

Gemeinhardt et al.

[11] Patent Number: 4,790,372

[45] Date of Patent: Dec. 13, 1988

[54] HEAT EXCHANGER HAVING FUSION BONDED PLASTIC TUBES/SUPPORT PLATE

[75] Inventors: Hermann Gemeinhardt, Obernburg, Fed. Rep. of Germany; Hugo P. Korstanje, Rozendaal, Netherlands

[73] Assignee: Akzo NV, Netherlands

[21] Appl. No.: 941,377

[22] Filed: Dec. 15, 1986

[30] Foreign Application Priority Data

Dec. 16, 1985 [DE] Fed. Rep. of Germany ....... 3544405
Apr. 28, 1986 [DE] Fed. Rep. of Germany ....... 3614322

[51] Int. Cl.$^4$ .......................... F16L 41/02; F28F 9/02
[52] U.S. Cl. .................................... 165/173; 165/905; 156/198; 156/294; 156/303.2; 156/308.2; 156/309.6
[58] Field of Search .................... 165/68, 79, 173, 178, 165/905, 907; 156/293, 296, 283, 294, 83, 198, 172, 303.1, 308.2, 309.6

[56] References Cited

U.S. PATENT DOCUMENTS

| | | | |
|---|---|---|---|
| 2,538,808 | 1/1951 | Swiss | 156/83 |
| 2,966,373 | 12/1960 | Yount | 165/178 |
| 3,315,740 | 4/1967 | Withers | 165/172 |
| 3,347,728 | 10/1967 | Preotle et al. | 165/173 |
| 3,438,434 | 4/1969 | Smith | 165/178 |
| 3,592,261 | 7/1971 | Black | 165/178 |
| 3,616,022 | 10/1971 | Withers | 156/296 |
| 3,741,849 | 6/1973 | Hardy | 165/173 |
| 3,841,938 | 10/1974 | Grosse-Holling et al. | 165/178 |
| 3,993,126 | 11/1976 | Taylor | 165/79 |
| 4,190,101 | 2/1980 | Hartman | 165/82 |
| 4,295,522 | 10/1981 | Frei | 165/79 |
| 4,300,971 | 11/1981 | McAlister | 165/178 |
| 4,481,057 | 11/1984 | Beard | 156/83 |

FOREIGN PATENT DOCUMENTS 2603615 8/1977 Fed. Rep. of Germany ...... 156/296

Primary Examiner—Merrell C. Cashion, Jr.
Attorney, Agent, or Firm—Parkhurst & Oliff

[57] ABSTRACT

Process for permanently fastening the end or ends of at least one rod, made at least partially of a thermoplastic material and having at least one continuous cavity, in at least one opening of a support plate. The opening surrounds at least one rod, with each rod - in order to be fastened - positioned in its designated opening in the support plate. Each rod cavity exhibits a hydraulic diameter which corresponds to at least 10% of the minimum outside cross-sectional dimension of the rod, and the rod walls may exhibit pores which take up a maximum of 20% of the wall volume. The rods are positioned with the support plate in such a manner that the ends are essentially arranged vertically upward and the support plate essentially horizontally, and, subsequently, sufficient heat is applied to the rod ends from above, so that the rod ends will soften at least to some extent and the outside walls of the rod ends will expand to such an extent that they touch the wall surfaces of the support plate openings and adhere or fuse to thereto. Also disclosed is a heat exchanger which may be formed by this process.

14 Claims, 6 Drawing Sheets

HEAT EXCHANGER HAVING FUSION BONDED PLASTIC TUBES/SUPPORT PLATE

FIELD OF THE INVENTION

The invention concerns a process for permanently fastening the end or ends of at least one rod made of a thermoplastic material, each rod having at least one continuous cavity, in at least one opening of a support plate. The opening surrounds at least one rod, with each rod positioned in its designated opening in the support plate. Each rod cavity exhibits a hydraulic diameter which is at least 10% of the minimum wall thickness of the rod, and the rod walls may exhibit pores which take up no more than 20% of the wall volume. The support plate, at least in the area of the openings, is made of a thermoplastic material, in particular a material suitable for the manufacture of heat exchangers.

The invention also concerns a heat exchanger, comprising a number of thermoplastic rods, each exhibiting at least one continuous cavity, whose ends are permanently joined to at least one support plate, with the cavities enlarged toward the ends of the thermoplastic rods.

The term "heat exchanger", as used in this specification, also covers substance exchangers, such as for gases, as well as sound absorbers for gas or liquid jets.

BACKGROUND OF THE INVENTION

A process of the same class and a heat exchanger of the same class are known from German Offenlegungsschrift No. 33 38 157. In the known process, the tubes are introduced into a tube sheet in the form of a perforated sheet. Subsequently, the tube ends are welded to the tube sheet by means of an ultrasound head. The production of an ultrasonic horn (sonotrode) which is suitable for use as an ultrasound head is very costly. By means of the known process, each tube end must either be welded to the tube sheet individually, which is very inefficient, or one needs a specially-designed ultrasonic horn for each desired tube arrangement or number of tubes, respectively. Moreover, if the tube ends are welded individually, some previously-welded tube ends could become partially loose again, due to the thermal effect, while adjacent tube ends are being welded. The outer contour of the ultrasonic horns may be selected to be conical. If such an ultrasonic horn is used for welding the tube ends to the tube sheet, each tube end on the tube sheet of the finished heat exchanger will be conically-enlarged toward its end. This enlargement facilitates the admission and discharge of the medium flowing in the heat exchanger. Through these enlargements one achieves a reduction in the pressure drop during admission of the medium into the tubes, which is not necessarily desirable, for instance if the heat exchanger manufactured by this process is to be used as a vaporizer. The heat exchanger manufactured according to the known process exhibits an annular bulge at each tube exit on the front surface of the tube sheet. In addition, a distinct boundary between the tube material and the tube sheet material is visible on the front surface of the tube sheet.

SUMMARY OF THE INVENTION

It is an object of the present invention to provide an especially simple process of the aforementioned type, in particular for the manufacture of a heat exchanger, which does not require any expensive tools and which can also be utilized independent of the desired arrangement of the rods. Moreover, it is an object of the present invention to provide an especially inexpensive heat exchanger. Preferably, there should be a seamless transition between the support plate material and the rod material, i.e., there should not be a visible boundary between the support plate material and the rod material. Another object is to provide a heat exchanger which is also suitable for use as a vaporizer.

BRIEF DESCRIPTION OF THE DRAWINGS

The invention is further explained by means of the drawings, in which.

DESCRIPTION OF THE INVENTION

Figure 1:
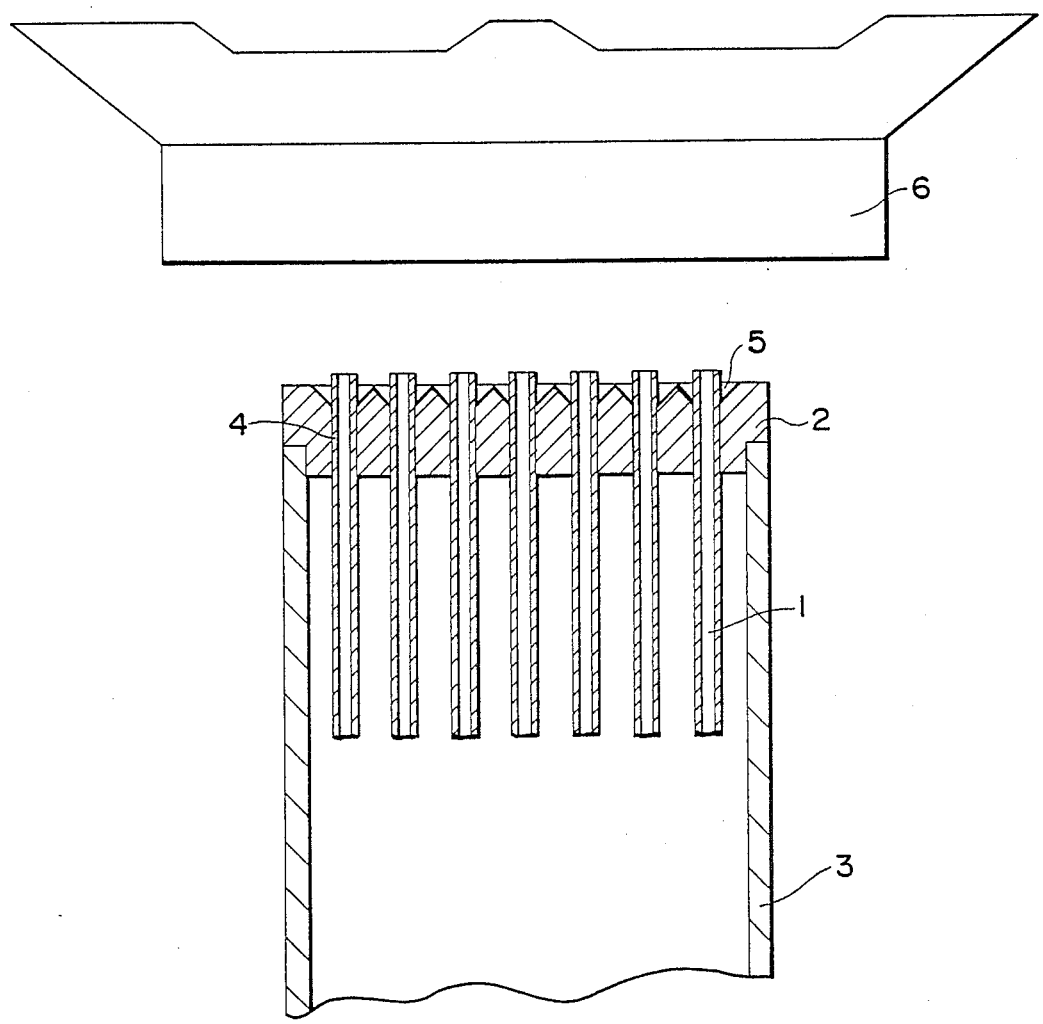
FIG. 1 shows a heat exchanger prepared for thermal treatment, with a heating plate already in place.

The above and other objects of the invention are achieved by positioning the rods in relation to the support plate in such a manner that the ends of the rods essentially extend vertically upward, and the support plate is arranged essentially horizontally. Subsequently, from above, a sufficient amount of heat is applied to the rod ends to cause them to soften at least partially and to cause the outside walls of the rod to expand to such an extent that they touch the walls of the support plate openings and adhere to same. To facilitate this, the support plate, at least in the area of the openings, must comprise a material to which the utilized rods will adhere when this process is used.

In this connection, it was found that, when the rods are arranged nearly vertically, the top ends of the rods will open up outwardly as soon as the thermoplastic material of the rods has reached a doughy consistency. This phenomenon is exploited by the process covered by this invention. Due to the heat radiation, the rod ends open out, touch the inner surfaces of the support plate openings and adhere to same as more heat is applied. As already mentioned, heat may be applied in the form of heat radiation, for instance by a heating plate. However, it could also be supplied by sound waves, light, electromagnetic waves, hot gases, etc. In special cases, the thermal treatment may take place in a vacuum or may be gas-shielded. The amount of heat required for the process as per this invention can be determined by means of simple tests. As a rule, the thermal treatment is applied in accordance with the following conditions:

$$0.0175 < Q\,e\left(\frac{t}{\zeta\,Cp\lambda}\right)^{\frac{1}{2}} < 0.5,$$

where

Q is the amount of heat applied per surface (front surface) and time in J/m²s e is the linear expansion coefficient of the rod material in 1/K, t is the time duration of the thermal effect in sec., $\zeta$ is the density of the rod material in kg/m³, $C_P$ is the specific heat of the rod material in J/kg K, and $\lambda$ is the thermal conductivity of the rod material in J/msK.

The degree of enlargement of the rod ends is best controlled by using rods of a thermoplastic material which has a mean linear expansion coefficient between $100 \times 10^{-6}$ and $400 \times 10^{-6}$ 1/K in the range between room temperature and melting temperature.

It is especially favorable if the support plate, at least in the area of the openings, is made of thermoplastic material and if sufficient heat is applied to the rod ends to cause them to fuse with the support plate. The insertion of the rods into the openings provided in the support plate is facilitated by utilizing support plates whose openings, at least in a cross-sectional dimension, are larger than the corresponding outside cross-sectional dimension of the rod by an amount that equals at least 20% of the wall thickness of the rod. It has also been found that this has an especially favorable effect on the strength of the joint between the rod and the support plate.

The process according to this invention will have excellent results with rods (which may have a porosity up to 10% of the wall volume) having cavities with a hydraulic diameter of between 0.3 and 15 mm, preferably between 0.5 and 7.5 mm, and having a wall thickness, at the thinnest point, between 5 and 25% of the hydraulic diameter, preferably between 7.5 and 17.5% of the hydraulic diameter. It is known that the hydraulic diameter is defined as the quotient of four times the inside cross-sectional area of one channel of the rod divided by the wetted inside perimeter (in this connection, refer to Dubbel, Taschenbuch fuer den Maschinenbau, 13th edition, 1970, page 314, paragraph 4):

$$d_h = 4 \times \left( \frac{\text{inside cross-sectional area}}{\text{wetted inside perimeter}} \right)$$

It is preferable to use support plates with openings whose cross sectional areas are enlarged, at least toward the front surface, in relation to the outside cross section of the utilized rods or rod groups, respectively. The rods should be positioned in such a manner that the rod ends extend into the support plate openings at least as far as the enlargements. The manner in which the cross-sectional area is enlarged or expanded, respectively, toward the front surface will have an influence on the inside contour of the rod after the heat treatment. If the cross sectional enlargement of the support plate openings toward the front surface is gradual, the rod inside cross sections will exhibit a constriction—in the direction of the inside of the rod—whose area is about 10 to 60% of the area of the inside cross section and which subsequently, toward the inside, changes-over to the rod inside cross section. If the cross sectional enlargement of the support plate openings toward the front surface is abrupt, the inside of the rod end will not exhibit any or only a hardly perceptible constriction of its inside cross section.

It has been found to be particularly advantageous, prior to the thermal treatment, to position the rods in the support plate openings in such a manner that the rod ends extend 1 to 2 mm beyond the front surface of the support plate.

The strength of the joint between the rod and the support plate can be enhanced—subsequent to the positioning but prior to the thermal treatment—by filling the clearance, if any, between the outer surface of the rods and the support plate openings at least partially with a polymer powder. Preferably, the utilized polymer powder should have a melting temperature which is about 5° to 50° C., preferably 20° to 50° C. below the melting temperature of the rod material. A polymer powder with an average particle size of 20 to 100 μm, preferably 40 to 100 μm is preferred. A particle size of over 100 μm, in many cases, will result in an undesirable, non-homogeneous surface.

The process according to the invention is particularly successful if the support plate, the rods and possibly the polymer powder as well, are made of thermoplastic polymers which, according to their basic structure, belong in the same group of polymers and/or have the same or nearly the same melting point or melting range, respectively.

The heat exchanger manufactured in accordance with the process of this invention exhibits a number of features which differ from those of the previously manufactured heat exchangers. For instance, if a heat exchanger is manufactured in accordance with the process known from DE-OS 33 38 157, supra, the front surface of the support plate or tube sheet, respectively, remains smooth; there is a clearly visible border line between the support plate material and the rod material, not only due to the annular bulge on the front surface of the support plate; and the insides of the rod ends show evidence of the use of contact ultrasonic horns. The front surface of a heat exchanger manufactured according to the process of this invention has the appearance of the typical thermoplastic hardened from the molten state, which might be compared to the surface of a crepe rubber shoe sole: the surface appears to be somewhat bubbly.

In a heat exchanger manufactured according to the process of this invention, even a cut through the plate and the tube will not reveal any transition between the support plate material and the rod material. Also, the surface of the support plate material exhibits the typical shine, recognized by the expert, of a thermoplastic material hardened from the molten state.

Objects of this invention, therefore, are also met by a heat exchanger comprising a number of thermoplastic rods, each hving at least one continuous cavity, whose ends are permanently joined to at least one support plate, wherein the cavities are enlarged toward the end of the thermoplastic rods, and which can be manufactured according to the process of this invention.

As a rule, the heat exchanger according to this invention is also distinguished in that each rod end is fused to the support plate at least to a depth which corresponds to the minimum wall thickness of the rod, viewed from the front surface of the support plate. As already mentioned above, the heat exchanger according to this invention, as a rule, is distinguished in that the rod material is fused with the support plate material in such a manner that there is a gradual transition between the two materials.

The rods of the heat exchanger may be embodied in the form of tubes which have one or several continuous cavities and whose hydraulic diameter (of the individual cavity) is between 0.5 and 15 mm and whose wall thickness, at the thinnest point, is between 5 and 25% of the hydraulic diameter. The heat exchangers according to this invention may also contain rods which comprise groups of tubes. These tube groups may have the outward shape of a plate, for instance if the tubes are lined up side by side with their axes parallel and extending along a straight line. However, they may also take the form of a shaped or spiral plate. In the case of a spiral plate, the tubes are lined up side by side in a group with their axes extending along an imaginary spiral line. Such a group of tubes may comprise 2 to 100,000 tubes, preferably 2 to 20,000.

If the heat exchangers according to this invention are used as vaporizers, each enlargement of the cross sections of the rod ends narrows toward the inside of the rod, to a cross section whose area is about 10 to 60% of the area of the inside cross section, with this constriction subsequently, toward the inside, changing over to the rod inside cross section. Preferably, the constricted cross section area equals about 20 to 50% of the area of the inside cross section.

The heat exchangers according to this invention may be made at least partially of a thermoplastic polymer which is one of the fluorine polymers. However, they may also be at least partially made of polyethylene or polypropylene.

The advantages of this invention, among other things, also lie in the fact that the joint between the rod and the support plate is established without the application of any mechanical force, and, therefore, the rod ends do not exhibit any signs of, for instance, a punch used to apply force. Such tools are not required in the use of the process of this invention. In the process according to this invention, the contact pressure of the rods against the walls of the support plate openings is strictly the result of the expansion of the rod ends caused by the thermal treatment. In addition, the cross sectional area of the heat source is dependent only on the outside diameter of the support plate, i.e., the same heat source may be used independent of the type, number and arrangement of the rods, as long as the cross sectional area of the heat source is adequately dimensioned. The process according to this invention does not involve any contact, so that the heat exchanger will not adhere to the heat source. Therefore, the front surface of the heat exchanger does not exhibit the hairy surface which is typical in the use of contact units.

FIG. 1 is a schematic representation showing a cross section through a heat exchanger in which, according to the process of the invention, the tubes (rods) 1 are introduced on the top side into a tube sheet (support plate) 2 in such a manner that they extend about 1.5 mm beyond the front surface with the conical enlargements (top side). The gaps, formed between the ends of the tubes 1 and the conical enlargements, have already been filled with polymer powder 5. The heat exchanger prepared in this manner was already placed, by means of a housing 3, below a heating plate 6—which delivers the heat radiation for the application of the process according to this invention—in such a way that the ends of the tubes are arranged vertically upward and the support plate is oriented essentially horizontally. After a sufficiently long period of exposure to the heat radiation, the tube ends are solidly joined to the tube sheet. The joint between the tube and tube sheet is shown in cross section in FIG. 2. The end of the tube 1 is arranged in the tube sheet 2, with the tube end in the tube sheet exhibiting a conical enlargement 7 and an annular bulge 8 toward the smallest cross section of this conical enlargement. The end of the tube 1 is solidly fused to the tube sheet 2 in the area of the conical enlargement 7 and the annular bulge 8.

Figure 2:
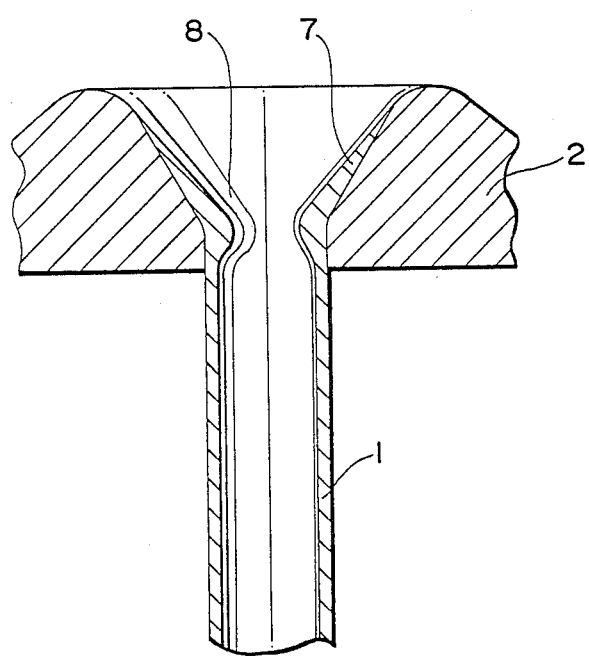
FIG. 2 shows the cross section through a joint of one tube with the tube sheet.

The conical enlargements of the front surface may be produced simply by countersinking the holes in the tube sheet. The joint between the tube and tube sheet will be especially strong if the tube sheet is also made of a thermoplastic material, particularly the same thermoplastic material as the tubes. The boundary line between the tube end and the tube sheet, as shown in FIG. 2, will no longer be visible, if the tube sheet 2—in the area of the openings—is made of thermoplastic material and if a sufficient amount of heat is applied to the tube end to cause the tube end 7 to fuse with the tube sheet 2.

Figure 3:
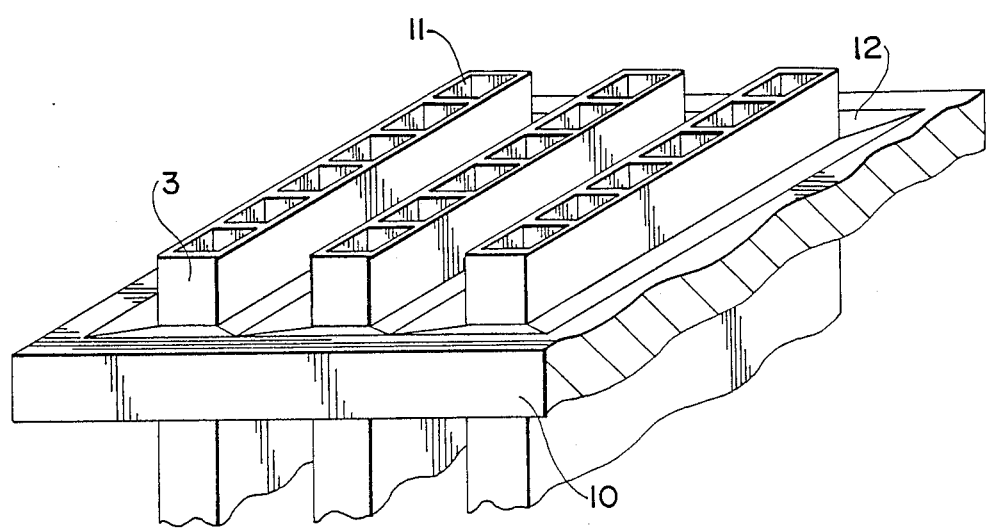
FIG. 3 is a perspective view of an arrangement of flat rod ends with several continuous passages, in a support plate, prior to thermal treatment.

FIG. 3 is a representation in perspective of an arrangement of flat rod ends 9 in a support plate 10. Each rod end 9 has six penetrating openings 11. The rod ends 9 are positioned in the support plate 10 in such a manner that they extend beyond the front surface of the support plate. The openings of the support plate 10 (not shown) exhibit enlargements 12 toward the front surface, which enlargements are shaped like an elongated, truncated pyramid.

Figure 4:
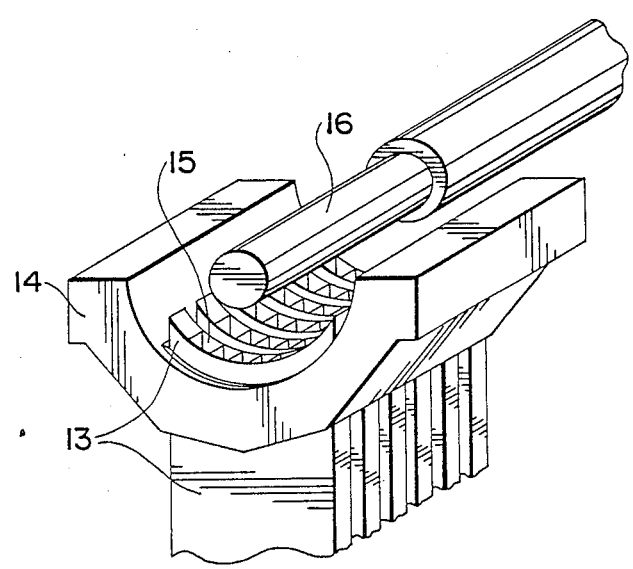
FIG. 4 is a perspective view of a possible arrangement of flat rods in a support plate prior to thermal treatment.

FIG. 4 is another representation in perspective of a possible arrangement of flat rods 13 whose ends have the contour of a circle segment, and which are arranged in a suitable support plate 14. These rods 13 also exhibit several continuous passages 16. For the thermal treatment, a heating rod 16, positioned as shown in FIG. 4, is especially useful.

Figure 5:
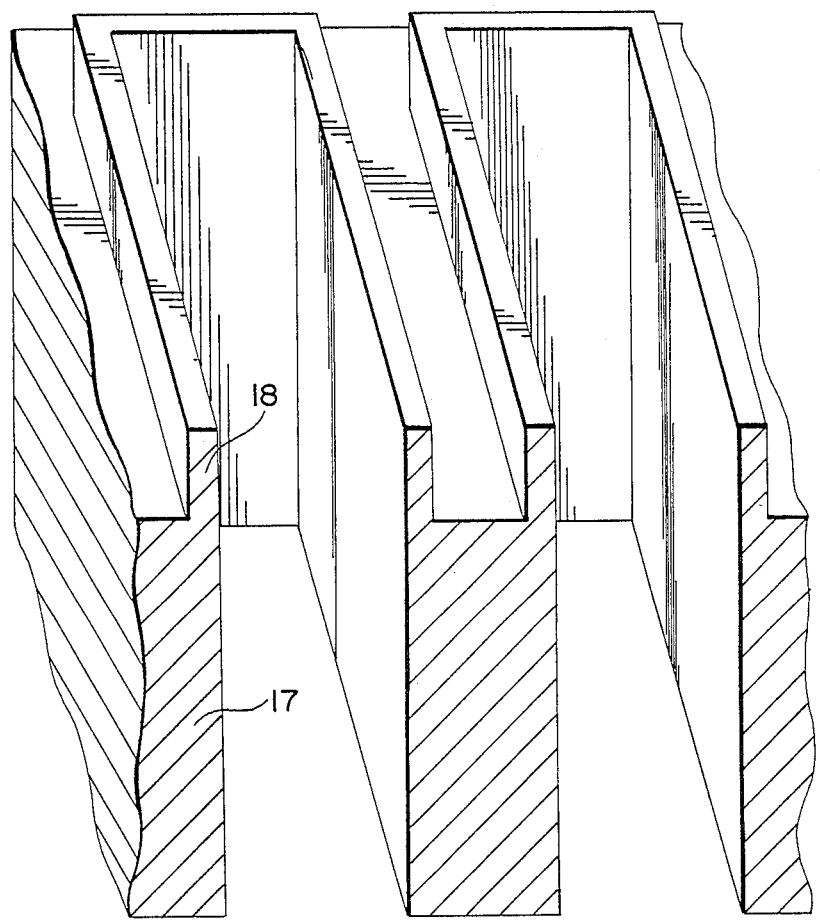
FIG. 5 is a perspective view of a possible embodiment of the support plate.
Figure 6:
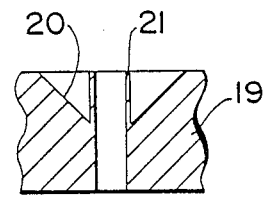
FIG. 6 is a schematic representation of a possible embodiment of a support plate opening.

The openings of the support plates 17 may also, as shown in FIG. 5, be developed in such a manner that they are extended in the direction of the front surface by means of webs 18 which project beyond the body of the support plate 17. Support plates of this design ensure an especially strong joint between the rod ends and the support plate. This applies as well to the design of an opening in the support plate 19, shown in FIG. 6. In this case, the support plate 19 exhibits an enlargement 20 in the direction of the front surface which, in the case of round rods, may be called conical and, in the case of flat rods, may be said to have the form of a truncated pyramid. Moreover, within the enlargements 20, there are webs 21, which guarantee that the fused bond with the rod ends will be especially intimate and strong. During the thermal treatment, the webs 21 will widen together with the rod ends so that the webs 21 will touch the enlargements 20. Subsequent to the thermal treatment, the webs 21 will be fused with the support plate 19, and the tube ends with the webs 21.

FIGS. 7 through 13 show examples of possible embodiments of enlargements of the support plate openings in the direction of the front surface.

Figure 7:
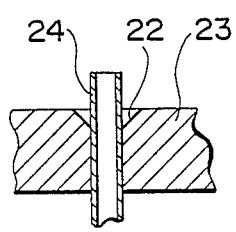
FIGS. 7 through 13 show the contours of various possible enlargements of the support plate openings.
Figure 8:
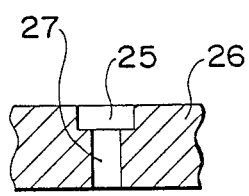

In FIG. 7, a rod end 24 is inserted into the support plate 23 in such a manner that the rod end 24 extends beyond the support plate 23. The support plate opening (not numbered) exhibits a gradual enlargement 22. In the case of round rods 24, the thermal treatment will result in the configuration shown in FIG. 2.

Figure 9:
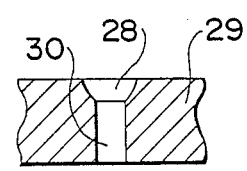
Figure 10:
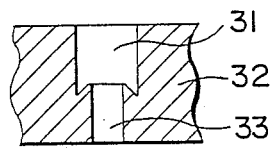
Figure 11:
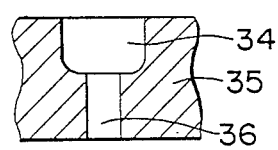
Figure 12:
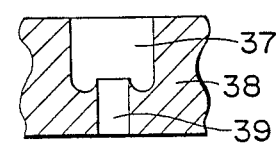
Figure 13:
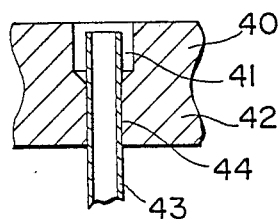

FIGS. 8, 10, 11 and 12 show abrupt enlargements 25, 31, 34 and 37, respectively of the openings 27, 33, 36 and 39, respectively, in the support plates 26, 32, 35 and 38, respectively. FIGS. 9 and 13 illustrate gradual enlargements 28 and 41, respectively, of the openings 30 and 44, respectively, in the support plates 29 and 42, respectively. In FIG. 13, the rod end 43 extends into the enlargement 41 of the support plate 42, however without projecting beyond the front surface of the support plate 42.

The following examples will serve to explain preferred embodiments of the invention in detail. They are intended for clarification, and not for limitation.

TABLE

| Property | Determination according to | Unit | PVDF type I | PVDF type II | PP |
|---|---|---|---|---|---|
| density | ASTM D 792 | g/cm$^3$ | 1.78 | 1.78 | 0.905 |
| melt flow index | ASTM D 1238 | | | | |
| —230° C. 10 kg | | g/10 min | 50 | 13 | — |
| —230° C., 5 kg | | g/10 min | 18 | 4 | 9 |
| —230° C., 2.16 kg | | g/10 min | 6 | 1 | 2 |
| crystalline melting point | | °C. | 177 | 177 | 160–166 |
| linear expansion coefficient | ASTM D 696 | K$^{-1}$ | $106 \times 10^{-6}$ | $128 \times 10^{-6}$ | $150 \times 10^{-6}$ |
| heat conductivity | ASTM C 177 | W/m × K | 0.19 | 0.19 | 0.22 |
| specific heat between 0 and 100° C. | | J/kg × K | 960 | 960 | 1700 |
| tensile strength 5 mm/min | ASTM D 638 | MPa | 57 | 54 | 35 |
| elongation 5 mm/min | ASTM D 638 | % | 12 | 80 | 700 |
| modulus at 1 mm/min | ASTM D 638 | MPa | 2600 | 2400 | 1300 |

EXAMPLE 1

A plate of PVDF type I (see Table), whose outside dimensions are 101 mm×50 mm×15 mm is provided with 28 penetrating slots which are vertical in relation to the top surface (101 mm×50 mm). Each slot is 40 mm long and 2 mm wide. The slots are parallel to each other and extend parallel in relation to the side of the plate which measures 50 mm. The distance between the slots is 3.5 mm. Beginning about 1 mm below the top surface—i.e., the future front surface—up to the top surface, the slots are widened on all sides, with the contour of the widening of opposite sides enclosing an angle at 60°. As a result, on the front surface, each slot has an opening of about 41.2 mm×3.2 mm.

Rods of PVDF type I, each 1 m long, 45 mm wide and 2 mm thick are inserted into the slots. Each rod has 20 continuous cavities with a hydraulic diameter of 1.6 mm, with a center-to-center distance of 2 mm between two adjacent, continuous cavities. The smallest wall thickness between a cavity and the outside of the rod is 0.2 mm. The rods are positioned in such a manner that the ends of the rods extend 1.5 mm beyond the front surface of the plate, that the rods as such are vertically arranged, and that the enlargements of the slots, and thus the front surface, are pointing up.

Now, a flat heating plate with a surface of 50 cm×50 cm, an emission coefficient of 0.9 and a temperature of 430° C., is directed toward the PVDF plate for two minutes at a distance of one centimeter, and is then removed.

An inspection of the front surface shows that now the end of each rod is bent outward and is adhering to the enlarged areas of the slots. A cut through such a rod end, parallel to the axis, reveals that, in the area of the enlargement of the rod, the rod has become partially fused with the wall of the slots over a length of 1.5 mm.

EXAMPLE 2

This example uses the same plate and the same rods as in Example 1, but this time, the rods are 39.5 mm wide. Again, the rods are inserted and positioned in the slots in the plate in such a manner that they extend about 1.5 mm beyond the front surface of the plate. The wedge-shaped gap, formed between the outer wall of the rods and the surface of the enlarged areas of the slots, is now partially filled with PVDF powder type I, whose mean particle size is 0.06 mm. Subsequent to the thermal treatment, as described in Example 1, the powder has melted. A cut, parallel to the longitudinal axis of the rod, shows that the rod has become evenly fused with the surface of the slot over a depth of 1.5 mm.

EXAMPLE 3

A cylindrical plate, made of PVDF type II, has a diameter of 150 mm and a thickness of 30 mm. The plate exhibits 1440 penetrating bores whose diameter is 2 mm. On the one surface, measuring 150 mm in diameter, of the plate—i.e., the front surface—all bores are abruptly enlarged. These abrupt enlargements have a diameter of 3 mm and a depth of 0.8 mm. A tube of 2 mm outside diameter and 0.15 mm wall thickness is inserted into each bore, and positioned in such a manner that the ends of the tube extend by 1.5 mm beyond the front surface. The tubes are made of PVDF type I.

The tubes are arranged vertically so that the front side of the plate points up. Polymer powder of type I, having a mean particle size of 0.06 mm, is sprinkled onto the plate and the slots formed by the tubes and the enlargements. Subsequently, the heating plate described in Example I is directed toward the front surface at a distance of 1 cm. The temperature of the heating plate is 430° C. After 2 minutes, the heating plate is removed. Then the plate, with the tubes permanently joined to it, is allowed to cool to room temperature.

EXAMPLE 4

Example 3 is repeated. Now, however, a plate is used whose enlargements are conical. The largest diameter of the conical enlargements, which lies on the front surface of the plate, is 3 mm while the center angle of the cone of the conical enlargement is 85°. After the thermal treatment, each tube exhibits an annular constriction at that point in the plate, where the transition between the cylindrical bore and the conical enlargement is located.

EXAMPLE 5

The manufacture of a heat exchanger, as described in Example 1, may proceed under the same process conditions if the material chosen for the plate and the rods is polypropylene (PP) as shown in the chart.

What is claimed is:

1. A heat exchanger manufactured by a process comprising
placing a support plate comprising a plurality of openings in an essentially horizontal position;
placing a plurality of thermoplastic rods, each having at least one continuous cavity therethrough in substantially vertical positions such that at least one end of each of said rods is positioned in and surrounded by an inner wall of an opening, said cavity exhibiting a hydraulic diameter at least as large as 10% of a minimum outside cross-sectional dimension of said rod; and
applying sufficient heat from above without contacting the support plate or rods with a source of said heat to soften said rod ends and to expand the outside walls of said rod ends to such an extent that said outside walls of said rod ends touch and adhere to said inner walls of said openings, thereby fusing the thermoplastic material of said outside walls of said rod ends to said inner walls of said openings such that a seamless transition between said thermoplastic material and the surface of said support plate is produced, each said rod being permanently fastened to at least one said support plate, wherein said cavities become enlarged toward said ends of said thermoplastic rods.

2. Heat exchanger according to claim 1, wherein said rod end is fused to said support plate at least to a depth, measured from a front surface of said support plate, which corresponds to a smallest wall thickness of said rod.

3. Heat exchanger according to claim 1, wherein said rod is in the form of a tube.

4. Heat exchanger according to claim 1, wherein said rod comprises a group of tubes.

5. Heat exchanger according to claim 4, wherein said tube group is formed of tubes arranged side by side with axes of said tubes extending along an imaginary spiral line.

6. Heat exchanger according to claim 4, wherein each tube group comprises 2 to 100,000 tubes.

7. Heat exchanger according to claim 4, wherein each tube group comprises 2 to 20,000 tubes.

8. Heat exchanger according to claim 1, wherein said enlarged portion of said cavity narrows toward the inside of the rod to a cross sectional area of about 10 to 60% of the area of the inside cross section of said rod before it changes over to said rod inside cross section.

9. Heat exchanger according to claim 8, wherein the area of the narrowed cross section is about 20 to 50% of the area of said rod inside cross section.

10. Heat exchanger according to claim 1, comprised of a thermoplastic fluorine polymer.

11. Heat exchanger according to claim 1, comprised of polyethylene.

12. Heat exchanger according to claim 1, comprised of polypropylene.

13. Heat exchanger according to claim 1, wherein said heat is applied by application of energy in a form selected from the group consisting of sound waves, electromagnetic waves and hot gases.

14. Heat exchanger according to claim 1, wherein said heat is applied in the form of heat radiation.

* * * * *